United States Patent
Ying et al.

(10) Patent No.: US 7,374,091 B2
(45) Date of Patent: May 20, 2008

(54) SCANNING MODULE

(75) Inventors: Meng-Yun Ying, Taipei (TW); Chung-Kai Wang, Taipei (TW)

(73) Assignee: Transpacific Plasma, LLC, Taipei (TW)

( * ) Notice: Subject to any disclaimer, the term of this patent is extended or adjusted under 35 U.S.C. 154(b) by 213 days.

(21) Appl. No.: 11/104,086

(22) Filed: Apr. 12, 2005

(65) Prior Publication Data

US 2006/0187498 A1    Aug. 24, 2006

(30) Foreign Application Priority Data

Feb. 18, 2005  (TW) .............................. 94104785 A

(51) Int. Cl.
*G06K 7/10* (2006.01)

(52) U.S. Cl. ................. 235/454; 235/439; 235/462.24; 235/462.41; 358/474

(58) Field of Classification Search ................ 235/451, 235/439, 462.24, 462.32, 462.41; 358/532, 358/484

See application file for complete search history.

(56) References Cited

U.S. PATENT DOCUMENTS

| | | | | |
|---|---|---|---|---|
| 5,933,248 | A * | 8/1999 | Hirata | 358/406 |
| 6,424,434 | B1 * | 7/2002 | Uchida | 358/474 |
| 6,805,295 | B2 * | 10/2004 | Barkan et al. | 235/462.32 |
| 6,832,725 | B2 * | 12/2004 | Gardiner et al. | 235/462.21 |
| 2004/0061908 | A1 * | 4/2004 | Cheng | 358/474 |
| 2005/0133599 | A1 * | 6/2005 | Qian et al. | 235/454 |

* cited by examiner

*Primary Examiner*—Seung Ho Lee
(74) *Attorney, Agent, or Firm*—Workman Nydegger

(57) ABSTRACT

A scanning module includes a main body and a sensor module. The sensor module includes a circuit board, a sensing element, an image sensor adjustable mechanism and four adjustable rods. By means of the image sensor adjustable mechanism and these four adjustable rods, the positions of the sensing element can be controlled in seven degrees of freedom.

40 Claims, 4 Drawing Sheets

SCANNING MODULE

FIELD OF THE INVENTION

The present invention relates to a scanning module, and more particularly to a scanning module having an adjustable mechanism capable of adjusting positions of an image sensor in seven degrees of freedom.

BACKGROUND OF THE INVENTION

Image scanners are commonly used in offices or homes for scanning for example documents, photographs or films. The scanned images can be converted into an electronic file so as to be stored in a computer or directly printed.

An image scanner principally comprises an optical scanning module and an electronic signal processing circuit. The scanning module comprises a light source, an image sensor such as a charge coupled device (CCD), a lens, and a reflective mirror. The light emitted from the light source is projected onto an object to be scanned. The light reflected from the scanned object is focused by the lens and then received by the CCD. According to the intensity of the received light, the CCD produces electronic signals of images.

As known, a precise focusing adjustment between the CCD and the lens is required during the scanning operation. If the focusing adjustment is improper, the quality of the scanned image is not satisfactory. Therefore, it is important to precisely, quickly and conveniently adjust the position of the CCD relative to the lens during the process of fabricating the scanning module.

Conventionally, in the process of fabricating a scanner with low resolution, the position of the CCD relative to the lens is manually adjusted to achieve orientation by an experienced worker in a production line. This process, however, is not applied to fabricate the scanner with high resolution.

One mechanism for adjusting the position of the CCD relative to the lens is described in Taiwanese Patent Gazette No. 407826, entitled "Adjustable fixing device of a CCD plate." Such a mechanism can adjust the CCD plate in four degrees of freedom. In addition, Taiwanese Patent Gazette No. 407826 also discloses another mechanism for adjusting the CCD plate in five degrees of freedom.

As known from the above discussion, those skilled in the art keep on researching other mechanisms for adjusting the CCD in more degrees of freedom in order to meet the requirement of the scanner with high resolution.

SUMMARY OF THE INVENTION

It is an object of the present invention to provide a scanning module having an adjustable mechanism capable of adjusting an image sensor in seven degrees of freedom.

In accordance with an aspect of the present invention, there is provided a scanning module for generating an electronic signal of an image of a scanned object in a scanning direction. The scanning module comprises a main body and a sensor module. The main body has therein a lens. The sensor module is used for generating the electronic signal, and comprises a circuit board, a sensing element, an image sensor adjustable mechanism and four adjustable rods. The circuit board has a surface perpendicular to the scanning direction. The surface has four openings discretely arranged in a rectangular shape. The sensing element is disposed on the surface of the circuit board for generating the electronic signal. The image sensor adjustable mechanism is disposed between the circuit board and the main body for adjusting a position of the sensing element relative to the lens. The image sensor adjustable mechanism comprises a first adjustable member and a second adjustable member. The second adjustable member comprises four fastening holes corresponding to the four openings of the circuit board. The four adjustable rods penetrate through corresponding openings and corresponding fastening holes, wherein the position of the sensing element relative to the lens is adjusted according to position adjustments of the four adjustable rods.

In an embodiment, two fixing sheets are extended from opposite sides of the first adjustable member so as to fix the first adjustable member on the surface of the circuit board.

In an embodiment, the first adjustable member further comprises two tabs, and the second adjustable member further comprises two resilient elements. These two tabs are sustained by the resilient forces resulting from corresponding resilient elements.

In an embodiment, the first adjustable member further comprises a rectangular accommodating chamber for accommodating the sensing element.

In an embodiment, the second adjustable member further comprises a rectangular perforation for the rectangular accommodating chamber to penetrate therethrough, and a surface of the main body perpendicular to the scanning direction further comprises a rectangular trench structure for accommodating the rectangular accommodating chamber.

In an embodiment, the main body further comprises two first connecting portions disposed on opposite sides of the rectangular trench structure, and the second adjustable member further comprises two second connecting portions to be coupled with corresponding first connecting portions.

In an embodiment, each of the two second connecting portions has a recess structure for filling an adhesive agent thereinto.

Preferably, the second adjustable member is made of transparent material such that the adhesive agent is quickly hardened when exposed to ultraviolet light.

Preferably, the adjustable rods are screws, and the fastening holes are screw holes.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
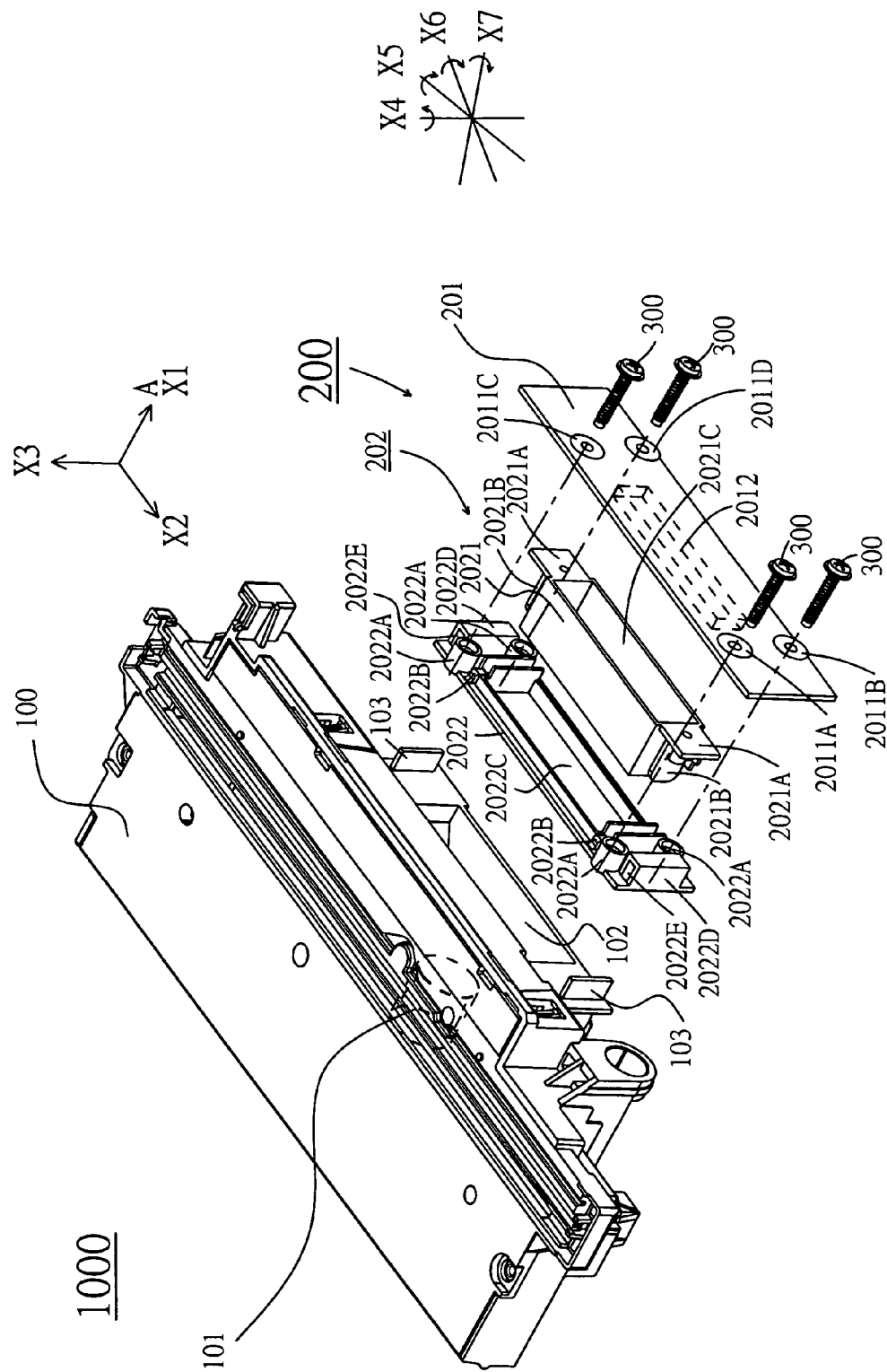
FIG. 1 is a schematic exploded diagram of a scanning module according to a preferred embodiment of the present invention.

Referring to FIG. 1, a schematic exploded diagram of a scanning module according to a preferred embodiment of the present invention is shown.

The scanning module 1000 of FIG. 1 comprises a main body 100 having therein a lens 101, and a sensor module 200.

The main body 100 comprises a rectangular trench structure 102 and two first connecting portions 103 disposed on opposite sides of the rectangular trench structure 102.

The sensor module 200 comprises a circuit board 201, a sensing element 2012, i.e. a charge coupled device (CCD), an image sensor adjustable mechanism 202 and four adjustable rods 300. In this embodiment, screws are employed as the adjustable rods 300.

The circuit board 201 has a surface perpendicular to the scanning direction A, and this surface has four openings 2011A~2011D discretely arranged in a rectangular shape.

The image sensor adjustable mechanism 202 is disposed between the circuit board 201 and the main body 100, and comprises a first adjustable member 2021 and a second adjustable member 2022. Two fixing sheets 2021A and two tabs 2021B are extended from opposite sides of the first adjustable member 2021. The first adjustable member 2021 further comprises a rectangular accommodating chamber 2021C for accommodating the image sensor 2012. The second adjustable member 2022 comprises four fastening holes 2022A corresponding to the four openings 2011A~2011D, two resilient elements 2022B, a rectangular perforation 2022C, and two second connecting portions 2022D. Each second connecting portion 2022D has a respective recess structure 2022E. In the embodiments wherein screws are employed as the adjustable rods 300, the fastening holes 2022A are screw holes.

The assembly and function of the components in FIG. 1 will be illustrated as follows. The CCD 2012 is fixed on the circuit board 201. The first adjustable member 2021 is fixed on the circuit board 201 via the fixing sheet 2021A, and the CCD 2012 is accommodated within the rectangular accommodating chamber 2021C. The rectangular accommodating chamber 2021C can penetrate through the rectangular perforation 2022C of the second adjustable member 2022. Under this circumstance, the tabs 2021B of the first adjustable member 2021 are in contact with corresponding resilient elements 2022B of the second adjustable member 2022, and directly sustained by the resilient forces resulting from the resilient elements 2022B. Then, the four screws 300 penetrate through corresponding openings 2011A~2011D of the circuit board 201 and corresponding fastening holes 2022A of the second adjustable member 2022, but are not tightly screwed at that time. Meanwhile, the circuit board 201, the first adjustable member 2021 and the second adjustable member 2022 are preliminarily assembled.

Then, the assembly of the circuit board 201, the first adjustable member 2021 and the second adjustable member 2022 is mounted onto the main body 100. The two first connecting portions 103 are inserted into the corresponding recess structures 2022E of the second connecting portions 2022D of the second adjustable member 2022, and then the rectangular accommodating chamber 2021C is embedded within the rectangular trench structure 102 so as to implement a preliminary assembly of the scanning module 1000.

The image sensor adjustable mechanism 202 allows the CCD 2012 to be adjusted in seven degrees of freedom, i.e. the axial directions X1~X7. In other words, in response to the resilient forces resulting from the resilient elements 2022B of the second adjustable member 2022 and acting on the tabs 2021B of the first adjustable member 2021, the relative position of the second adjustable member 2022 to the first adjustable member 2021 is adjustable in the axial direction X1, thereby adjusting the position of the CCD 2012 in the axial direction X1, which is parallel to the scanning direction A. On the other hand, by adjusting the relative positions of the first connecting portions 103 to the second connecting portions 2022D in the axial directions X2 and X3, the positions of the CCD 2012 in the axial directions X2 and X3 are adjustable. As shown in the drawings, the axial directions X1, X2 and X3 are perpendicular to each other.

Then, the positions of the CCD 2012 are adjustable in the axial directions X4~X7 according to degree of tightness for respective screws 400. Under this circumstance, the circuit board 201 is slightly rotated along the axial directions X4~X7 indicated by the arrows as shown in FIG. 1. The axial direction X4 is parallel to the linear direction between the openings 2011A and 2011B. The axial direction X5 is parallel to the linear direction between the openings 2011A and 2011C. The axial direction X6 is parallel to the linear direction between the openings 2011B and 2011C. The axial direction X7 is parallel to the linear direction between the openings 2011A and 2011D.

As known, by using a computer system, the optimum position of the CCD 2012 relative to the lens 101 can be discriminated. Once the relative positions between all components of the scanning module are discriminated to be optimum, a final fixing operation of the scanning module is performed. This fixing operation comprises the steps of filling an adhesive agent into the recess structures 2022E of the second connecting portions 2022D, and allowing the screws 300 to screw tight. After the adhesive agent is hardened, the scanning module can be removed to perform a next fabricating procedure.

Figure 2:
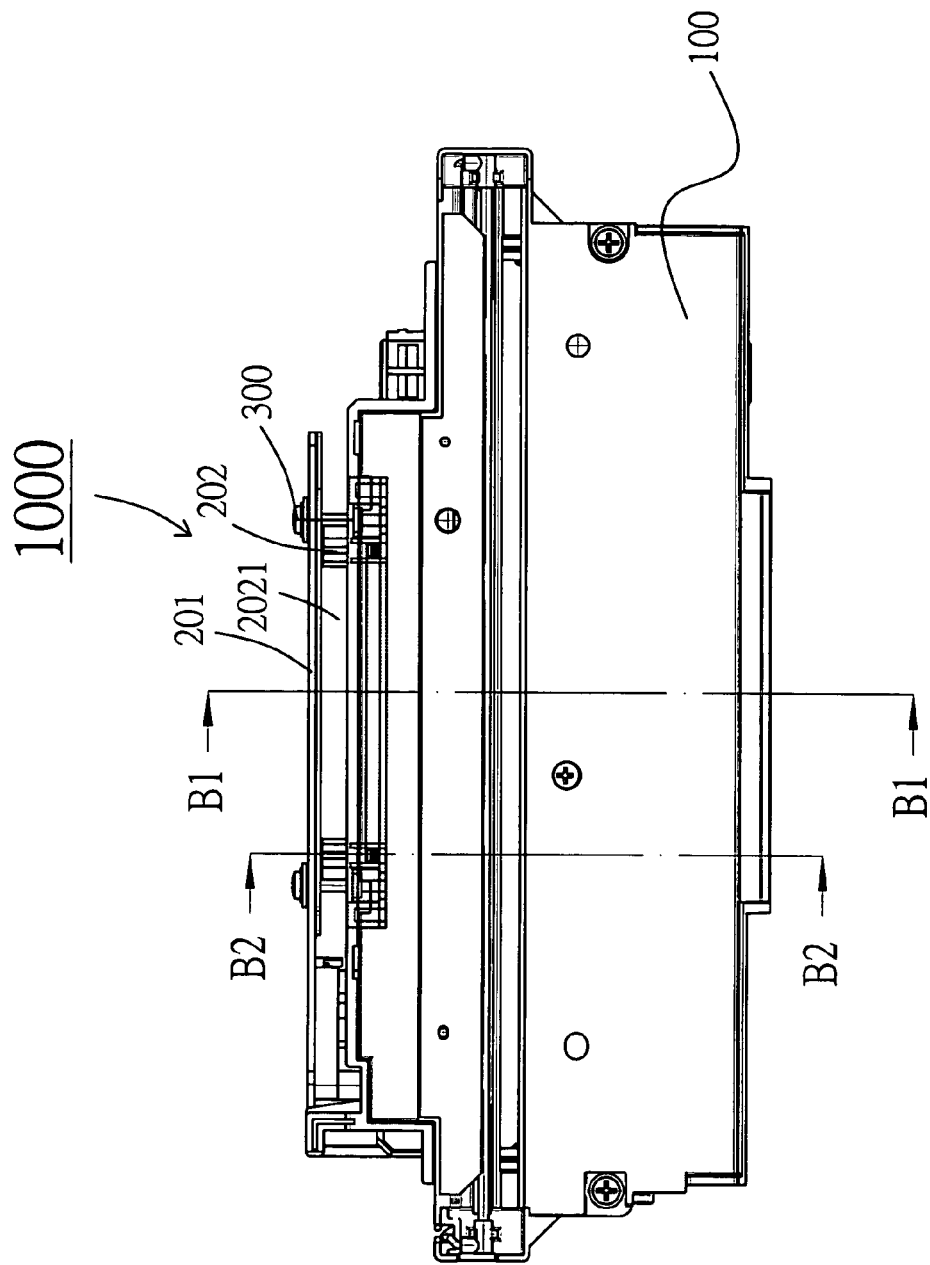
FIG. 2 is a top view of the assembled scanning module of FIG. 1.
Figure 3A:
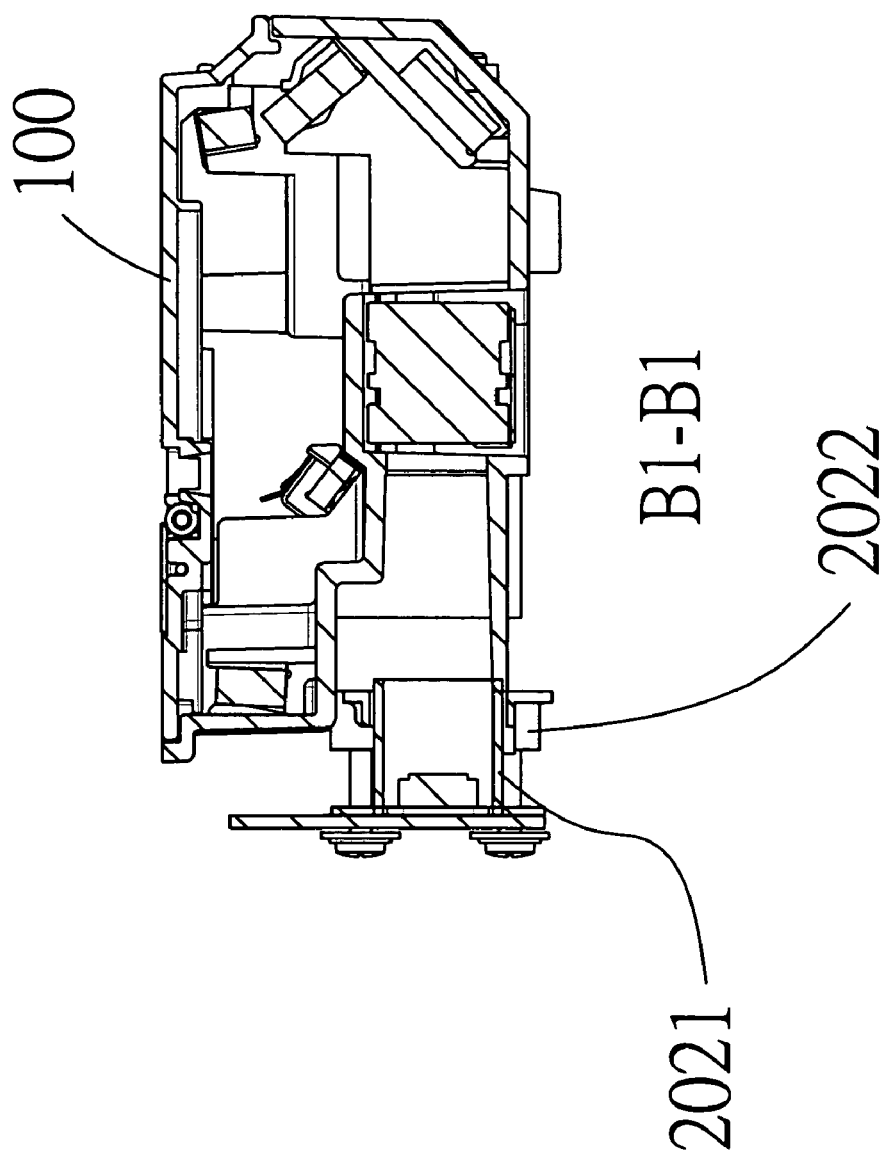
FIG. 3A is a cross-sectional view of the scanning module of FIG. 2 along the line B1—B1.
Figure 3B:
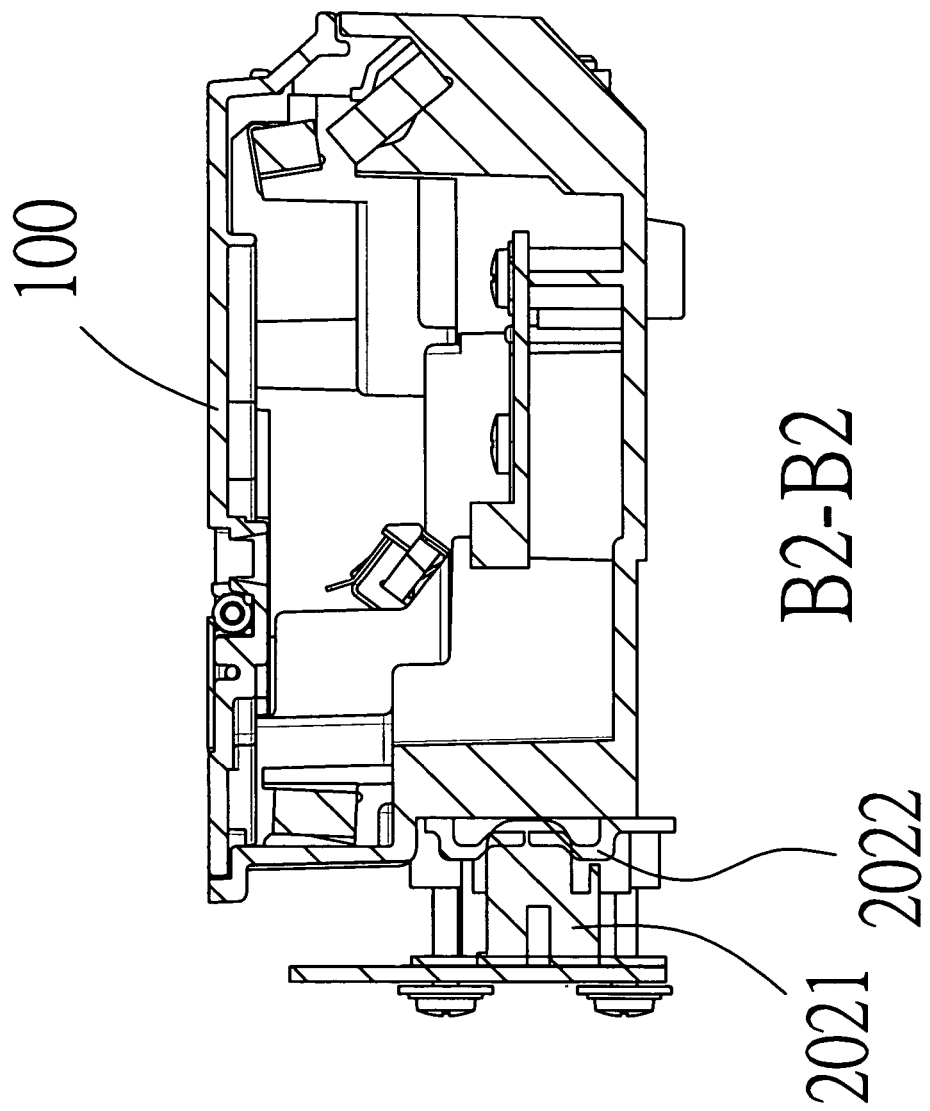
FIG. 3B is a cross-sectional view of the scanning module of FIG. 2 along the line B2—B2.

Please refer to FIGS. 2, 3A and 3B. FIG. 2 is a top view of the assembled scanning module according to the present invention. FIGS. 3A and 3B are cross-sectional views of the scanning module of FIG. 2 along the lines B1—B1 and B2—B2, respectively.

In the above embodiment, the adjustable rods 300 and the fastening holes 2022A are screws and screw holes, respectively. It is noted that, however, those skilled in the art will readily observe that numerous modifications and alterations of the adjustable rods 300 and the fastening holes 2022A may be made while retaining the teachings of the invention. For example, each of the adjustable rods 300 can be an elongated rod without thread, and the cross section thereof may be polygonal or circular. Instead of using the screw holes, the fastening holes 2022A can be circular trench structures for the adjustable rods 300 to penetrate therethrough. In addition, the cylindrical body surface of each circular trench structure has an injection hole or screw hole. After the adjustable rod 300 is adjusted to an optimum position by using a jig tool, either an adhesive agent is filled into the injection hole, or the screw hole is screwed by another screw so that the adjustable rods 300 are fixed in the corresponding fastening holes 2022A. Accordingly, the above disclosure should be limited only by the bounds of the following claims.

The adhesive agent used in the present invention can be quickly hardened when exposed to ultraviolet light. That is to say, the second adjustable member 2022 is made of transparent material. Once the second adjustable member 2022 is exposed to ultraviolet light, the adhesive agent within the recess structures 2022E will be quickly hardened so as to shorten the time period of assembling the scanning module. Since the CCD 2012 is accommodated within the rectangular accommodating chamber 2021C of the first adjustable member 2021 and the first adjustable member 2021 is made of opaque material, the CCD 2012 will not be exposed to the external light during the period of adjusting the position of the CCD 2012 and exposing the second adjustable member 2022 to ultraviolet light.

From the above description, the scanning module of the present invention is capable of permitting position adjustment in seven degrees of freedom by adjusting the first adjustable member, the second adjustable member and four screws such that the CCD element can be precisely aligned. In addition, since the second adjustable member is transparent, the first adjustable member is opaque, and the accommodating chamber for accommodating the sensor is disposed within the first adjustable member, the adhesive agent will be quickly hardened when exposed to ultraviolet light and the CCD 2012 is not exposed to the external light during the period of adjusting the position of the CCD 2012. In such manner, the time period of fabricating the scanning module is largely reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanning module for generating an electronic signal of an image of a scanned object in a scanning direction, said scanning module comprising:
    a main body having therein a lens; and
    a sensor module for generating said electronic signal, and comprising:
        a circuit board having a surface perpendicular to said scanning direction, said surface having four openings discretely arranged in a rectangular shape;
        a sensing element disposed on said surface of said circuit board for generating said electronic signal;
        an image sensor adjustable mechanism disposed between said circuit board and said main body for adjusting a position of said sensing element relative to said lens, and comprising a first adjustable member and a second adjustable member, wherein said second adjustable member comprises four fastening holes corresponding to said four openings of said circuit board; and
        four adjustable rods penetrating through corresponding openings and corresponding fastening holes, wherein said position of said sensing element relative to said lens is adjusted according to position adjustments of said four adjustable rods.

2. The scanning module according to claim 1 wherein two fixing sheets are extended from opposite sides of said first adjustable member so as to fix said first adjustable member on said surface of said circuit board.

3. The scanning module according to claim 2 wherein said first adjustable member further comprises two tabs, and said second adjustable member further comprises two resilient elements, wherein said two tabs are sustained by the resilient forces resulting from corresponding resilient elements.

4. The scanning module according to claim 3 wherein said first adjustable member further comprises a rectangular accommodating chamber for accommodating said sensing element.

5. The scanning module according to claim 4 wherein said second adjustable member further comprises a rectangular perforation for said rectangular accommodating chamber to penetrate therethrough, and a surface of said main body perpendicular to said scanning direction further comprises a rectangular trench structure for accommodating said rectangular accommodating chamber.

6. The scanning module according to claim 5 wherein said main body further comprises two first connecting portions disposed on opposite sides of the rectangular trench structure, and said second adjustable member further comprises two second connecting portions to be coupled with corresponding first connecting portions.

7. The scanning module according to claim 6 wherein each of said two second connecting portions has a recess structure for filling an adhesive agent thereinto.

8. The scanning module according to claim 7 wherein said second adjustable member is made of transparent material such that said adhesive agent is quickly hardened when exposed to ultraviolet light.

9. The scanning module according to claim 1 wherein said adjustable rods are screws, and said fastening holes are screw holes.

10. A scanner module comprising:
    a main body having a lens disposed therein:
    a carrier;
    an image sensor on the carrier;
    an adjustable mechanism disposed between the carrier and the main body; and
    at least three adjustable rods disposed through a plurality of openings in the carrier and at least partially through the adjustable mechanism, wherein the adjustable mechanism is capable of adjusting the position of the image sensor in relation to the lens, depending at least in part on adjustments to the adjustable rods, wherein the carrier is configured to have a plurality of degrees of freedom comprising a rotation about a first diagonal axis that intersects a first and a second of the at least three openings.

11. The scanner module of claim 10, wherein a first of the plurality of degrees of freedom comprises a horizontal direction parallel to a scanning direction.

12. The scanner module of claim 11, wherein a second of the plurality of degrees of freedom comprises a horizontal direction perpendicular to the scanning direction.

13. The scanner module of claim 12, wherein a third of the plurality of degrees of freedom comprises a vertical direction perpendicular to the scanning direction.

14. The scanner module of claim 10, wherein the plurality of degrees of freedom further comprises a rotation about a second diagonal axis that intersects the first and a third of the at least three openings.

15. The scanner module of claim 14, wherein the plurality of degrees of freedom further comprises a rotation about an axis parallel to a horizontal direction perpendicular to the scanning direction.

16. The scanner module of claim 15, wherein the plurality of degrees of freedom further comprises a rotation about an axis parallel to a vertical direction perpendicular to the scanning direction.

17. The scanner module of claim 10, wherein the adjustable mechanism comprises a first adjustable member and a second adjustable member.

18. The scanner module of claim 17, wherein said first adjustable member comprises two tabs and wherein said second adjustable member comprises two resilient elements, wherein said two tabs are sustained by the resilient forces resulting from said resilient elements.

19. The scanner module of claim 18, wherein said first adjustable member further comprises a rectangular accommodating chamber for accommodating said image sensor.

20. The scanner module of claim 19, wherein said second adjustable member further comprises a rectangular perforation for said rectangular accommodating chamber to penetrate therethrough, and a surface of said main body perpendicular to a scanning direction further comprises a rectangular trench structure for accommodating said rectangular accommodating chamber.

21. The scanner module of claim 20, wherein said main body further comprises two first connecting portions disposed on opposite sides of the rectangular trench structure, and wherein said second adjustable member further comprises two second connecting portions to be coupled with corresponding first connecting portions.

22. The scanner module of claim 21, wherein each of said two second connecting portions comprises a recess structure for filling an adhesive agent thereinto.

23. The scanner module of claim 22, wherein said second adjustable member comprises a transparent material such that said adhesive agent is quickly hardened when exposed to ultraviolet light.

24. The scanner module of claim 10, wherein said adjustable rods comprise screws, and wherein said fastening holes comprise screw holes.

25. A scanner, comprising:
a scanner module including:
a main body;
a lens disposed in the main body;
a circuit board including an image sensor;
an adjustable mechanism disposed between the circuit board and the main body; and
at least three adjustable rods disposed through a plurality of openings in the circuit board and at least partially through the adjustable mechanism, wherein the adjustable mechanism is capable of adjusting the position of the image sensor in relation to the lens, depending at least in part on adjustments to the adjustable rods, with a plurality of degrees of freedom comprising a rotation about a first diagonal axis intersecting a first and a second of the plurality of openings.

26. The scanner of claim 25, wherein a first of the plurality of degrees of freedom comprises a horizontal direction parallel to a scanning direction.

27. The scanner of claim 26, wherein a second of the plurality of degrees of freedom comprises a horizontal direction perpendicular to the scanning direction.

28. The scanner of claim 27, wherein a third of the plurality of degrees of freedom comprises a vertical direction perpendicular to the scanning direction.

29. The scanner of claim 25, wherein the plurality of degrees of freedom further comprises a rotation about a second diagonal axis intersecting the first and a third of the least three adjustable rods.

30. The scanner of claim 29, wherein the plurality of degrees of freedom further comprises a rotation about an axis parallel to a horizontal direction perpendicular to the scanning direction.

31. The scanner of claim 30, wherein a seventh of the plurality of degrees of freedom comprises a rotation about an axis parallel to a vertical direction perpendicular to the scanning direction.

32. A scanner module comprising:
a main body having a lens disposed therein;
means for sensing an image, said means for sensing disposed in a first plane;
means for positioning the means for sensing, wherein the means for positioning is disposed between the means for sensing and the main body; and
means for adjusting the means for positioning, wherein the means for adjusting is capable of adjusting the position of the image sensor in relation to the lens with a plurality of degrees of freedom depending at least in part on adjustments to the means for adjusting, wherein the plurality of degrees of freedom comprises rotations about two or more axes that are disposed in the first plane.

33. The scanner module of claim 32, wherein the means for adjusting in conjunction with the means for positioning is capable of adjusting the position of the means for sensing with the plurality of degrees of freedom, wherein the plurality of degrees of freedom exceeds four degrees of freedom.

34. The scanner module of claim 33, wherein a first of the plurality of degrees of freedom comprises a horizontal direction parallel to a scanning direction.

35. The scanner module of claim 34, wherein a second of the plurality of degrees of freedom comprises a horizontal direction perpendicular to the scanning direction.

36. The scanner module of claim 35, wherein a third of the plurality of degrees of freedom comprises a vertical direction perpendicular to the scanning direction.

37. The scanner module of claim 36, wherein the means for adjusting comprises three or more adjustable rods surrounding the means for sensing, and further wherein a first of the two or more axes is defined by a first and a second of the three or more adjustable rods.

38. The scanner module of claim 37, wherein the plurality of degrees of freedom further comprises a rotation about a second of the two or more axes defined by the first and a third of the three or more adjustable rods.

39. The scanner module of claim 38, wherein a sixth of the plurality of degrees of freedom comprises a rotation about an axis parallel to said horizontal direction perpendicular to the scanning direction.

40. The scanner module of claim 39, wherein a seventh of the plurality of degrees of freedom comprises a rotation about an axis parallel to said vertical direction perpendicular to the scanning direction.

* * * * *

UNITED STATES PATENT AND TRADEMARK OFFICE
CERTIFICATE OF CORRECTION

PATENT NO. : 7,374,091 B2  Page 1 of 1
APPLICATION NO. : 11/104086
DATED : May 20, 2008
INVENTOR(S) : Ying et al.

It is certified that error appears in the above-identified patent and that said Letters Patent is hereby corrected as shown below:

Column 5
Line 52, after "1" insert --,--
Line 56, after "2" insert --,--
Line 61, after "3" insert --,--
Line 65, after "4" insert --,--

Column 6
Line 5, after "5" insert --,--
Line 11, after "6" insert --,--
Line 14, after "7" insert --,--
Line 18, after "1" insert --,--

Column 7
Line 55, before "least" insert --at--

Column 8
Line 1, omit "a seventh of"
Line 2, after "freedom" insert --further--

Signed and Sealed this

Twenty-seventh Day of October, 2009

David J. Kappos
*Director of the United States Patent and Trademark Office*